(12) United States Patent
Shin

(10) Patent No.: US 10,387,036 B2
(45) Date of Patent: Aug. 20, 2019

(54) MEMORY SYSTEM AND OPERATING METHOD THEREOF

(71) Applicant: SK hynix Inc., Gyeonggi-do (KR)

(72) Inventor: Beom Ju Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 257 days.

(21) Appl. No.: 15/366,467

(22) Filed: Dec. 1, 2016

(65) Prior Publication Data

US 2018/0011635 A1    Jan. 11, 2018

(30) Foreign Application Priority Data

Jul. 8, 2016    (KR) .................. 10-2016-0086785

(51) Int. Cl.
*G06F 3/06*    (2006.01)

(52) U.S. Cl.
CPC ............ *G06F 3/0604* (2013.01); *G06F 3/068* (2013.01); *G06F 3/0626* (2013.01); *G06F 3/0659* (2013.01); *G06F 3/0679* (2013.01)

(58) Field of Classification Search
CPC .... G06F 3/0604; G06F 3/0626; G06F 3/0659; G06F 3/0679
See application file for complete search history.

(56) References Cited

U.S. PATENT DOCUMENTS

| | | | | |
|---|---|---|---|---|
| 2008/0104283 | A1* | 5/2008 | Shin | G06F 3/0611 710/6 |
| 2014/0068159 | A1* | 3/2014 | Yi | G06F 12/0246 711/103 |
| 2016/0011779 | A1* | 1/2016 | Lee | G06F 3/061 711/103 |

FOREIGN PATENT DOCUMENTS

| | | |
|---|---|---|
| KR | 1020050020188 | 3/2005 |
| KR | 1020090124102 | 12/2009 |

OTHER PUBLICATIONS

Perepelitsa, Costya, Quora—Why do we use registers instead of memory?, https://www.quora.com/Why-do-we-use-registers-instead-of-memory, Feb. 23, 2015 (Year: 2015).*

* cited by examiner

*Primary Examiner* — Prasith Thammavong
*Assistant Examiner* — Edmund H Kwong
(74) *Attorney, Agent, or Firm* — IP & T Group LLP

(57) ABSTRACT

A semiconductor memory device according to the present disclosure includes: a memory cell array including a plurality of planes; a command processing unit configured to generate an internal command to be executed by at feast one plane among the plurality of planes on the basis of external commands received from an external controller; a status register configured to store status information of the external commands by a tag included in the external command according to results of performing the internal command.

16 Claims, 11 Drawing Sheets

MEMORY SYSTEM AND OPERATING METHOD THEREOF

CROSS-REFERENCE TO RELATED APPLICATION

The present application claims priority under 35 U.S.C. § 119(a) to Korean patent application no. 10-2016-0086785 filed on Jul. 8, 2016, which is incorporated herein by reference in its entirety.

BACKGROUND

1. Field

Various embodiments of the present disclosure relate to an electronic device and, more particularly, to a memory system, and an operating method thereof.

2. Description of the Related Art

Memory systems are widely used as data storage devices for digital devices such as a computer, a digital camera a MP3 player, and a smartphone. Such a memory system may include a semiconductor memory device, which stores data, and a controller for controlling the semiconductor memory device. Each of the digital devices operates as a host of the memory system, and the controller transmits commands and data between the host and the semiconductor memory device.

Semiconductor memory devices are memory devices embodied using a semiconductor such as silicon (Si), germanium (Ge), silicon germanium (SiGe), gallium arsenide (GaAs), indium phosphide (InP) or the like. Semiconductor memory devices are generally classified into volatile memory devices and nonvolatile memory devices.

A volatile memory device is a memory device in which data stored therein is lost when power is turned off. Representative examples of a volatile memory device include a static random access memory (RAM) (SRAM) a dynamic RAM (DRAM) and a synchronous DRAM (SDRAM). A nonvolatile memory device is a memory device in which data stored therein is maintained even when power is turned off. Representative examples of a nonvolatile memory device include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), and a ferroelectric RAM (FRAM). A flash memory is classified into a NOR type memory and a NAND type memory.

SUMMARY

Various embodiments of the present disclosure are directed to a memory system having simpler flash memory interface, and an operating method thereof.

One embodiment of the present disclosure provides a semiconductor memory device including: a memory cell array including a plurality of planes; a command processing unit configured to generate an internal command to be executed by at least one plane among the plurality of planes based on external commands received from an external controller; and a status register configured to store status information of the external commands by tags included in the external commands according to results of performing the internal command.

Another embodiment of the present disclosure provides an operating method of a semiconductor memory device including a memory cell array divided into a plurality of planes, the operating method including: inputting an external command received from a controller, to a first command queue; decoding the external command inputted to the first command queue and inputting the decoded external command to a second command queue; generating an internal command, for at least one plane among the plurality of planes based on the decoded command inputted to the second command queue; and performing an operation for the at least one plane according to the generated internal command.

Still another embodiment of the present disclosure provides a controller for controlling a semiconductor memory device including a memory cell array divided into a plurality of planes, the controller including: a command generation unit configured to generate a command for the semiconductor memory device in response to a request received from an external host and add a tag for identifying the generated command; a command queue configured to input the generated command and tag; and a memory control unit configured to transmit an external command to the semiconductor memory device, the external command including the command and the tag inputted to the command queue.

Still another embodiment of the present disclosure provides an operating method of a controller for controlling a semiconductor memory device, including: receiving a request for the semiconductor memory device from a host; generating a command corresponding to the request; generating an external command formed by adding a tag to the command, the tag being provided to identify the command; and transmitting a generated external command to the semiconductor memory device.

BRIEF DESCRIPTION OF THE DRAWINGS

The above and other features and advantages of the present invention will become more apparent to those skilled in the art to which the present invention pertains by describing in detail various embodiments thereof with reference to the accompanying drawings in which.

DETAILED DESCRIPTION

Figure 1:
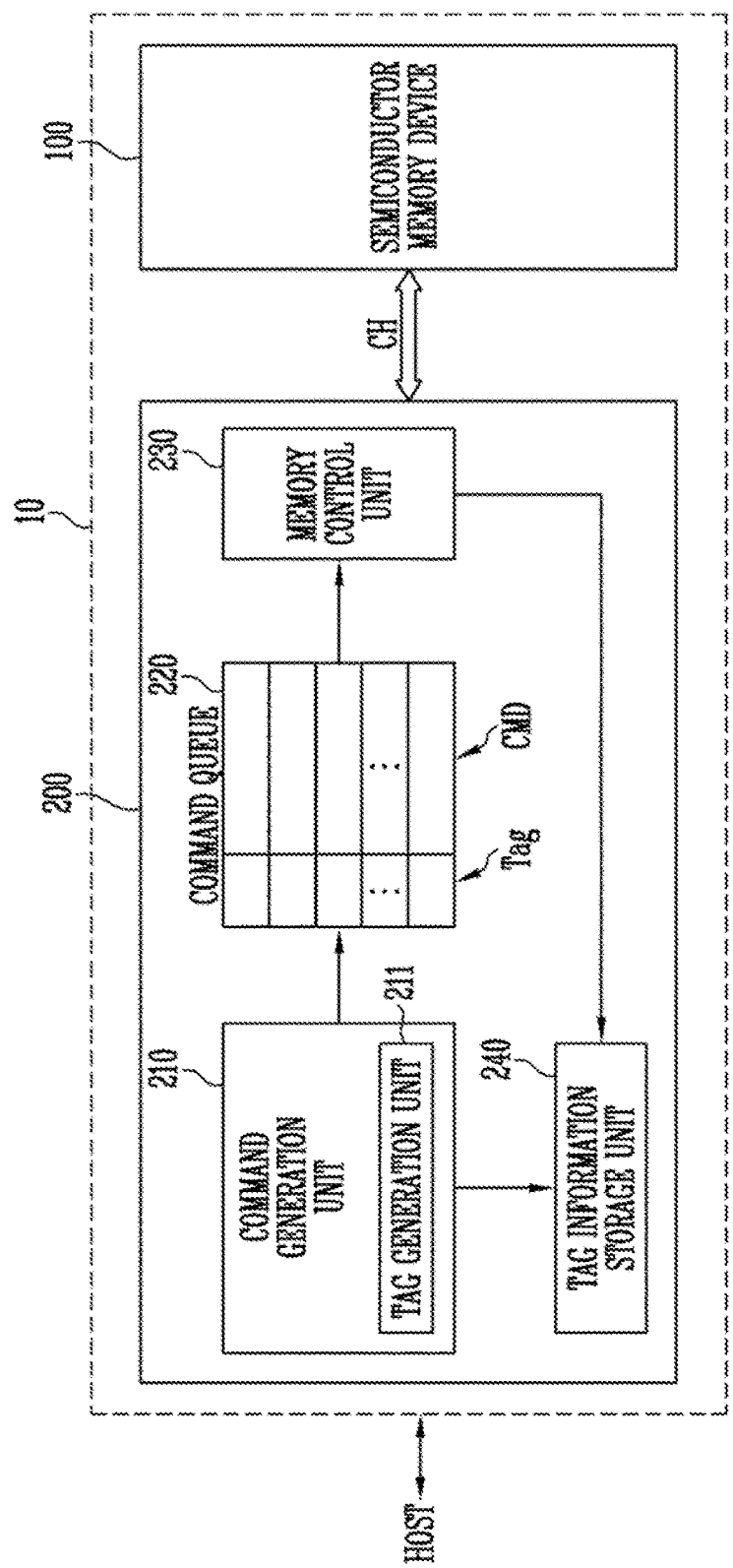
FIG. 1 is a block diagram illustrating a memory system coupled to a host, according to an embodiment of the present disclosure.

Hereinafter, embodiments will be described in greater detail with reference to the accompanying drawings. However, we note that the present invention may be embodied in different forms and should not be construed as being limited to the embodiments set forth herein. Rather, these embodiments are provided so that this disclosure will be thorough and complete, and will fully convey the scope of the example embodiments to those skilled in the art.

In the figures, dimensions may be exaggerated for clarity of illustration.

It is further noted that the figures are simplified schematic illustrations of various embodiments of the present invention and intermediate structures. As such, well known elements may be omitted and variations from the shapes of the illustrations as a result, for example, of manufacturing techniques and/or tolerances are also to be expected. The described embodiments should not be construed as being limited to the particular shapes of regions illustrated herein but may include deviations in shapes that result, for example, from manufacturing.

Like reference numerals in the drawings denote like elements.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure.

It will be further understood that, when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

Spatially relative terms, such as "under," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in manufacturing, use or operation in addition to the orientation depicted in the figures. For example, if the device in the figures is turned over, elements described as "below" or "under" other elements or features would then be "above" the other elements or features. The device may be otherwise oriented (rotated 90 degrees or at other orientations) and the spatially relative descriptors used herein interpreted accordingly.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including," when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention pertains in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known structures or processes have not been described in order not to unnecessarily obscure the present invention.

It is also noted, that in some instances, as would be apparent to those skilled in the relevant art, an element (also referred to as a feature) described in connection with one embodiment ay be used singly or in combination with other elements of another embodiment, unless specifically indicated otherwise.

Referring now to FIG. 1 a memory system 10 is provided, according to an embodiment of the present disclosure.

The memory system 10 includes a semiconductor memory device 100 operatively coupled to a controller 200.

The semiconductor memory device 100 may be a non-volatile memory device. The semiconductor memory device 100 may be a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), a spin transfer torque random access memory (STT-RAM) or the like. The semiconductor memory device 100 may be embodied in a three-dimensional array structure. The present disclosure may be applied to a charge trap flash (CTF) in which a charge storage layer is configured of an insulating layer as well as a flash memory device in which a charge storage layer is configured of a conductive floating gate (FG). In an embodiment, the semiconductor memory device 100 may be a flash memory device and, more particularly, the semiconductor memory device 100 may be a NAND flash memory.

The semiconductor memory device 100 is configured to receive a command, an address and data through a channel CH from the controller 200. The semiconductor memory device 100 may access a memory region selected by the received address from among a memory cell array included in the semiconductor memory device 100. The semiconductor memory device 100 may perform an operation corresponding to the received command in the memory region selected by the received address. The received command may for example be a read command, a program command (write command) or an erase command. For example, the semiconductor memory device 100 may perform a program operation, a read operation or an erase operation based on a received program, read or erase command respectively. In a program operation, the semiconductor memory device 100 receives a program command, data and an address from the controller and may program the received data (also referred to as write or program data) to a region of a memory cell array of the semiconductor memory device 100 selected using the received address. In a read operation, the semiconductor memory device 100 receives a read command and an address from the controller 200 and may read data from a region of a memory cell array of the semiconductor memory device 100 selected using the received address and may output the read data to the controller 200. The controller 200 may then output the read data to the host. In an erase operation, the semiconductor memory device 100 may erase data stored in a region of a memory cell array selected by an address received together with an erase command from the controller 200.

The controller 200 controls the semiconductor memory device 100 in response to a request from a host. The controller 200 is configured to access the semiconductor memory device 100 in response to a request from the host. For example, the controller 200 is configured to control various operations of the semiconductor memory device 100 such as read, program, erase, and background operations. The controller 200 is configured to provide an interface between the host and the semiconductor memory device 100. The controller 200 is configured to drive firmware for controlling the semiconductor memory device 100.

As illustrated in the embodiment of FIG. 1, the controller 200 may include a command generation unit 210, a command queue 220, a memory control unit 230 and a tag information storage unit 240.

The command generation unit 210 is configured to control an operation of the controller 200. The command generation unit 210 is configured to generate a command and input the generated command to the command queue 220.

For example, when a request is received from the host, the command generation unit 210 may generate a command corresponding to the request and input the generated command to the command queue 220. The request may be at least one of a read, program, and an erase request and the command generation unit 210 may generate a corresponding read, program and erase command.

The command generation unit 210 may generate a command without a request from the host and input the command to the command queue 220. For example, the command generation unit 210 may generate a command for a background operation such as an operation for wear leveling of the semiconductor memory device 100 or an operation for garbage collection of the semiconductor memory device 100 without receiving a request form the host and input the command to the command queue 220.

The command generation unit 210 may drive firmware (FW) for controlling the semiconductor memory device 100. For example, the command generation unit 210 may be configured to manage firmware such as a flash translation layer (FTL). The command generation unit 210 may translate a logical address included in a request from the host into a physical address corresponding to a physical location of the memory storage space. The command generation unit 210 may store a physical address associated with a corresponding command, in a memory such as a random access memory (RAM) (not shown) of the controller 200.

The command generation unit 210 may further include a tag generation unit 211. When the command generation unit 210 generates a command corresponding to a request inputted from the host, the tag generation unit 211 may add a tag to the generated command and may then input the command having the added tag, to the command queue 220. Different tags may be added to respective commands. In an embodiment, tags may be successively added to commands in a round-robin manner. Each command may be uniquely identified by the added tag.

The command generation unit 210 may be operatively coupled with the host. In an embodiment, the command generation unit 210 may include a host interface (not shown) for communicating with the host. The host interface may be coupled with the command generation unit via an internal bus (not shown). The host interface may include any suitable protocol for performing data exchange between the host and the controller 200. In an embodiment, the command generation unit 210 may be configured to communicate with the outside (e.g., the host) through at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, and the like.

The command queue 220 is coupled between the command generation unit 210 and the memory control unit 230. In operation, the command queue 220 may be managed in a first in first out method where the first command to enter the command queue 220 is processed first. The command queue 220 receives a command from the command generation unit 210, and outputs a command to the memory control unit 230. The command queue 220 may store commands CMD and tags Tag corresponding to the respective commands together. The command queue 220 may output commands CMD and tags Tag corresponding to the respective commands together to the memory control unit 230.

The memory control unit 230 may receive commands CMD and tags Tag from the command queue 220. The memory control unit 230 is configured to communicate with the semiconductor memory device 100 according to control of the command generation unit 210. The memory control unit 230 operates under the control of the command generation unit 210. The memory control unit 230 may transmit commands CMD and tags Tag that are received from the command queue 220, to the semiconductor memory device 100, thereby commanding the semiconductor memory device 100. The memory control unit 230 may transmit not only a command but also a physical address corresponding to the command to the semiconductor memory device 100.

In the following, the words "transmitting a read command for a selected page" refer to transmitting the read command and a physical address indicating the selected page. The words "transmitting a program command for a selected page" refer to transmitting the program command, a physical address indicating the selected page, and data to be programmed. The words "transmitting an erase command for a selected memory block" refer to transmitting the erase command and a physical address indicating the selected memory block.

In an embodiment, each of a program operation and a read operation for the semiconductor memory device 100 may be performed on a page basis. An erase operation for the semiconductor memory device 100 may be performed on a block basis.

The memory control unit 230 may include a protocol which provides an interface for communicating with the semiconductor memory device 100. In an embodiment, the memory control unit 230 may include at least one flash interface such as a NAND interface and a NOR interface. In a particular embodiment, the semiconductor memory device may be a NAND semiconductor memory device and the memory control unit may include a NAND interface.

The tag information storage unit 240 may operate according to control of the command generation unit 210. The tag information storage unit 240 may store a tag generated by the tag generation unit 211 of the command generation unit 210 and mapping information linking the tag to a corresponding command to which the tag is added.

In an embodiment, the tag information storage unit 240 may store operation status information about an operation status of a command corresponding to a certain tag. For example, the controller 200 may transmit a read status command to the semiconductor memory device 100 and receive a read status report in response to the read status command from the semiconductor memory device 100, which includes information on whether a command transmitted from the controller 200 to the semiconductor memory device has passed or failed. The controller 200 may then store the received operation status information of the command in the tag information storage unit 240 according to the tag of the command.

Figure 11:
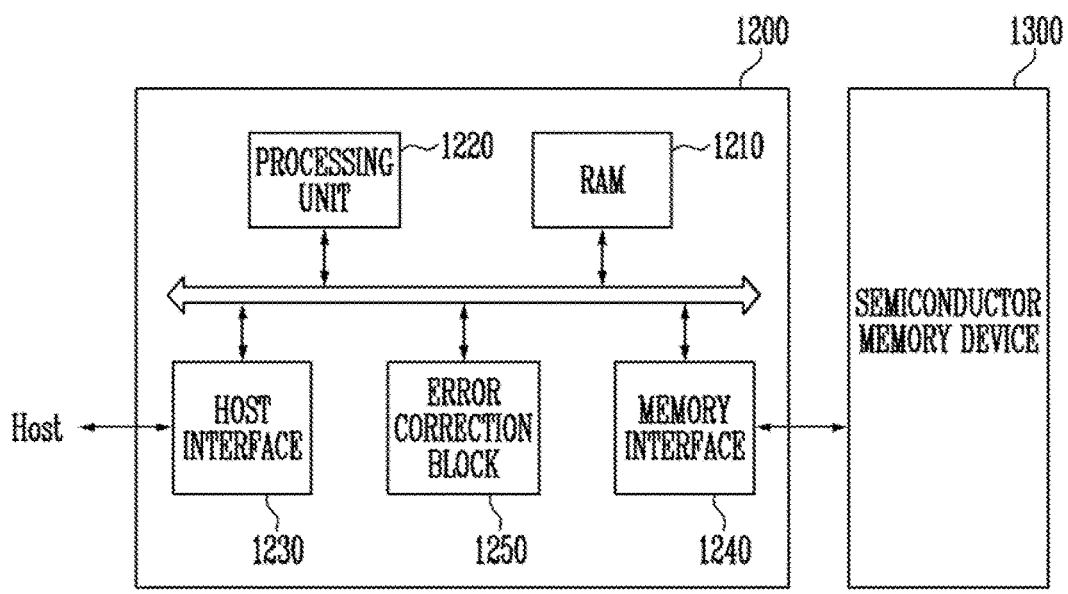
FIG. 11 is a block diagram of a memory system employing a controller, according to an embodiment of the present disclosure.

The controller 200 may include a buffer memory (see for example, RAM 1210 in FIG. 11). The buffer memory may be used as an operation memory of the controller 200, and as a buffer memory between the semiconductor memory device 100 and the host. In an embodiment, the buffer memory may be used as a cache memory between the semiconductor memory device 100 and the host. Alternatively, the buffer memory may be used as a buffer that temporarily stores data inputted from the semiconductor memory device 100. For example, the buffer memory may include at least one of various memories, which are capable of random access, such as a static random access memory (RAM) (SRAM), a dynamic RAM (DRAM), a synchronous DRAM (SDRAM), a phase-change RAM (PRAM), a magnetic RAM (MRAM), a resistive RAM (RRAM), a ferroelectric RAM (FRAM), a NOR flash memory, and the like.

The semiconductor memory device 100 may include a memory cell array including a plurality of memory cells. The memory cell array may include one or more planes (See for example FIG. 2). In other words, the semiconductor memory device 100 may include one or more planes. The number of planes employed may differ. For example, the semiconductor memory device 100 may include $2^n$ planes wherein n is 0 or a natural number. In specific embodiments, the semiconductor memory device 100 may include one, two, four or eight planes.

At least one of the basic operations of the semiconductor memory device 100, for example program, read and erase operations, may be performed on a plane basis. Therefore, if the semiconductor memory device 100 includes two or more planes, at least one basic operation for at least two planes may be simultaneously performed. Such an operation will also be referred to hereinafter as a multi-plane operation.

In an embodiment, at least one basic operation of the semiconductor memory device may be performed simultaneously in each of the plurality of planes of the semiconductor memory device 100. So for example, if the semiconductor memory device includes four planes a basic operation such as a read operation may be performed simultaneously in each of the four planes of the semiconductor memory device. Otherwise, for example, a first read operation may be performed in the first plane, an erase operation may be performed in the second plane, a program operation may be performed in the third plane, and a second read operation may be performed in the fourth plane.

The controller 200 may control whether a multi-plane operation is performed or not, and thus perform a single plane operation or a multi plane operation. The semiconductor memory device 100 may also perform simultaneously various other operations, such as, for example, a cache program operation and a cache read operation, as well as a single plane basic operation or a multi-plane basic operation. When the controller 200 controls the execution of all of the operations, the design in the interface of the controller 200 with the memory device may be changed depending on operations to be supported by the semiconductor memory device 100.

In an embodiment of the present disclosure, the semiconductor memory device 100 may provide a memory interface that controls whether or not a single plane operation, or a multi-plane operation is performed. The memory interface of the semiconductor device 100 may be in addition to the memory interface of the controller 200.

Figure 2:
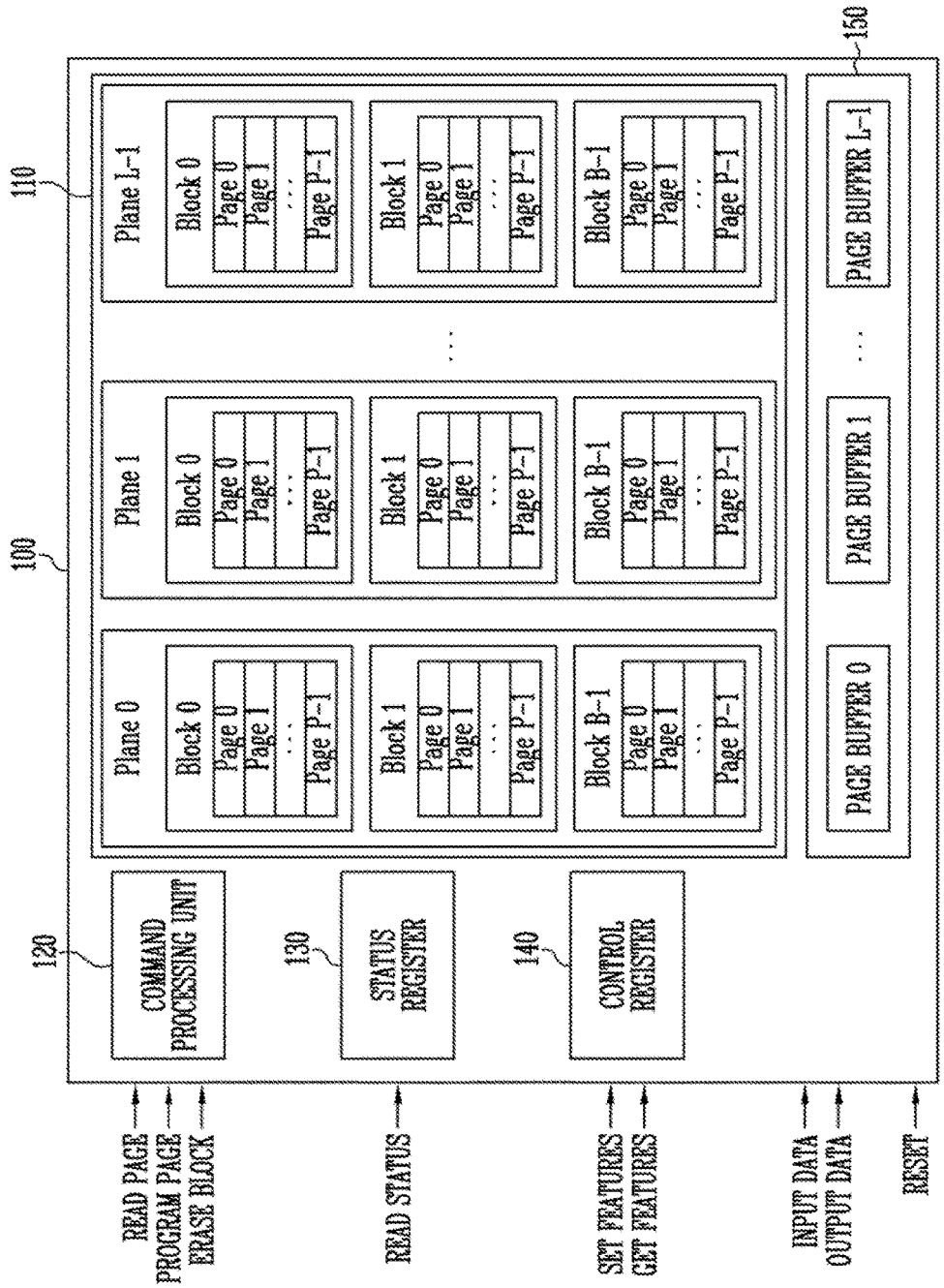
FIG. 2 is a block diagram illustrating a configuration of a semiconductor memory device which is employed in the memory system of FIG. 1, according to an embodiment of the present disclosure.

FIG. 2 illustrates a structure and interface of the semiconductor memory device 100 of FIG. 1, according to an embodiment of the present disclosure.

Referring to FIG. 2, the semiconductor memory device 100 may include a memory cell array 110, a command processing unit 120, a status register 130, a control register 140 and a read/write circuit 150.

The memory cell array 110 includes a plurality of memory cells. The memory cell array 110 may be organized into a plurality of planes (e.g., L planes Plane 0 to Plane L-1). Each of the planes may include a plurality of memory blocks (e.g., B blocks Block 0 to Block B-1). Each of the memory blocks may include a plurality of memory cells. The memory cells in each block may be organized into a plurality of pages (e.g., P pages Page 0 to Page P-1). For example, a plurality of memory cells controlled coupled to the same word line within the same block form one page. Each memory cell may be a nonvolatile memory cell, for example, a NAND memory cell.

A program operation and a read operation among the operations of the semiconductor memory device 100 may be performed on a page basis, and an erase operation may be performed on a memory block basis.

The command processing unit 120 is operatively coupled to the controller 200 of FIG. 1 for receiving an external command from the controller 200. The external command received by the command processing unit 120 may be any one of a program command, a read command or an erase command. The external command received from the controller 200 by the command processing unit 120 include a tag corresponding to the command. External commands received from the controller 200 may be identified by their associated tags. The command processing unit 120 may input the external commands received from the controller 200, to a first command queue e.g., 121 of FIG. 3 as will be discussed more in detail in reference to FIG. 3. Therefore, the external commands and their associated tags may be inputted to the first command queue 121. The command processing unit 120 may decode the commands inputted to the first command queue 121 and input to a second command queue e.g., second command queue 123 of FIG. 3 included in the command processing unit 120. The decoded external command inputted to the second command queue 123 may include tags, commands, and an address indicating a page of the memory array 110. For example, the address may include a plane addresses for selecting one lane among the plurality of planes, a block address for selecting one block among the plurality of blocks included in the selected plane, and a page address for electing one page among the plurality of pages within a selected block.

The command processing unit 120 may generate internal commands for at least one plane among the plurality of planes Plane 0 to Plane L-1 of the memory cell array 110 using the commands inputted to the second command queue 123. The generated internal commands may be commands for a single plane. Alternatively, the generated internal commands may be commands for a plurality of planes, i.e., a multi-plane operation. The internal commands may be commands for one page. Alternatively, the internal commands may be commands for a plurality of pages. For example, the internal commands may include commands related to the implementation of the semiconductor memory device 100 such as a single plane erase command, a multi-plane erase command, a single plane program command, a multi-plane program command, a cache program command, a multi-page program command, a single plane read command, a multi-plane read command, a cache read command, a random read command, a multi-page read command, a half-page read command, a foggy-fine program command or a copyback operation command.

The command processing unit 120 may generate an internal command on the basis of at least one piece of information among the kinds of commands inputted to the second command queue, and an address such as a plane address a block address, and a page address. The tags included in the external commands received from the controller 200 may be inputted to the first command queue 121, and the internal command generated by the command processing unit 120 may include the same tag value as that of the tag inputted to the first command queue 121. The command processing unit 120 may transmit the generated internal command to a control logic (see for example control circuit 1030 of FIG. 10) which may be included in the semiconductor memory device 100, and the control logic may perform an operation corresponding to the received command.

The detailed operation of the command processing unit 120 will be explained in more detail in the description of FIG. 3.

The status register 130 may store the tag of the internal command generated by the command processing unit 120 and status information of the corresponding command. The status information of the internal command may be information about whether the execution of the corresponding command has been completed or not and whether it has passed or failed. The controller 200 may obtain, using the read status command, the status information stored in the status register 130. The number of entries that can be stored in the status register 130, that is, the depth of the status register 130, may be the same as the number or depth of entries of the second command queue 123 included in the command processing unit 120.

The structure of the status register 130 will be explained its more detail in the description of FIG. 4.

The control register 140 may store information about various parameters of the semiconductor memory device 100. The parameter information may include information about various parameters related to the semiconductor memory device 100 such as page information, plane information, information about the type of a memory cell, program voltage information, erase voltage information, and read voltage information that are included in the semiconductor memory device 100.

The parameter information included in the control register 140 may be stored in the control register itself, or in a specific region of a memory cell array. In an embodiment the parameter information may be stored in a One Time Programmable (OTP) block. In the embodiment, the parameter information may include information about the depths of the first command queue and second command queue of the command processing unit 120, and the depths of page buffers included in the read/write circuit 150.

The parameter information stored in the control register 140 may be classified into modifiable parameters and non-modifiable parameters. The controller 200 may transmit a control information request command, which requests the value of the control register 140, and obtain parameter information. Here, the control information request command may be a GET FEATURES command. The controller 200 may transmit a control information set command, which modifies the value of the control register 140, and modify parameter information. In this regard, the control information set command may be a SET FEATURES command.

The structure of the control register 140 will be explained in more detail in the description of FIG. 5.

The read/write circuit 150 may include a plurality of page buffers (e.g., L page buffers PAGE BUFFER 0 to PAGE BUFFER L-1). The number of page buffers may be the same as the number of planes of the memory cell array 110. The plurality of page buffers PAGE BUFFER 0 to PAGE BUFFER L-1 are coupled to the memory cell array 110 through a plurality of bit lines (not shown).

The page buffers PAGE BUFFER 0 to PAGE BUFFER L-1 may receive data to be programmed from the controller 200, during a program operation. The page buffers PAGE BUFFER 0 to PAGE BUFFER L-1 may output data read out from the memory cell array 110 to the controller 200, during a read operation. The controller 200 may input data to the page buffers or obtain data stored in the page buffers, through a data input command INPUT DATA and a data output command OUTPUT DATA.

The page buffers PAGE BUFFER 0 to PAGE BUFFER L-1 may store tags and data corresponding to the associated tags. In an embodiment, each of the tags stored in the page buffers may have the same value as that of a command corresponding to the associated tag. The command for the corresponding data may be identified by the tag. For example, data stored in the same tag as that of a program command may be data to be programmed by the corresponding program command. In addition, data stored in the same tag as that of a read command may be data read out according to the corresponding read command.

The structure of the page buffers will be explained in more detail in the description of FIG. 6.

Figure 3:
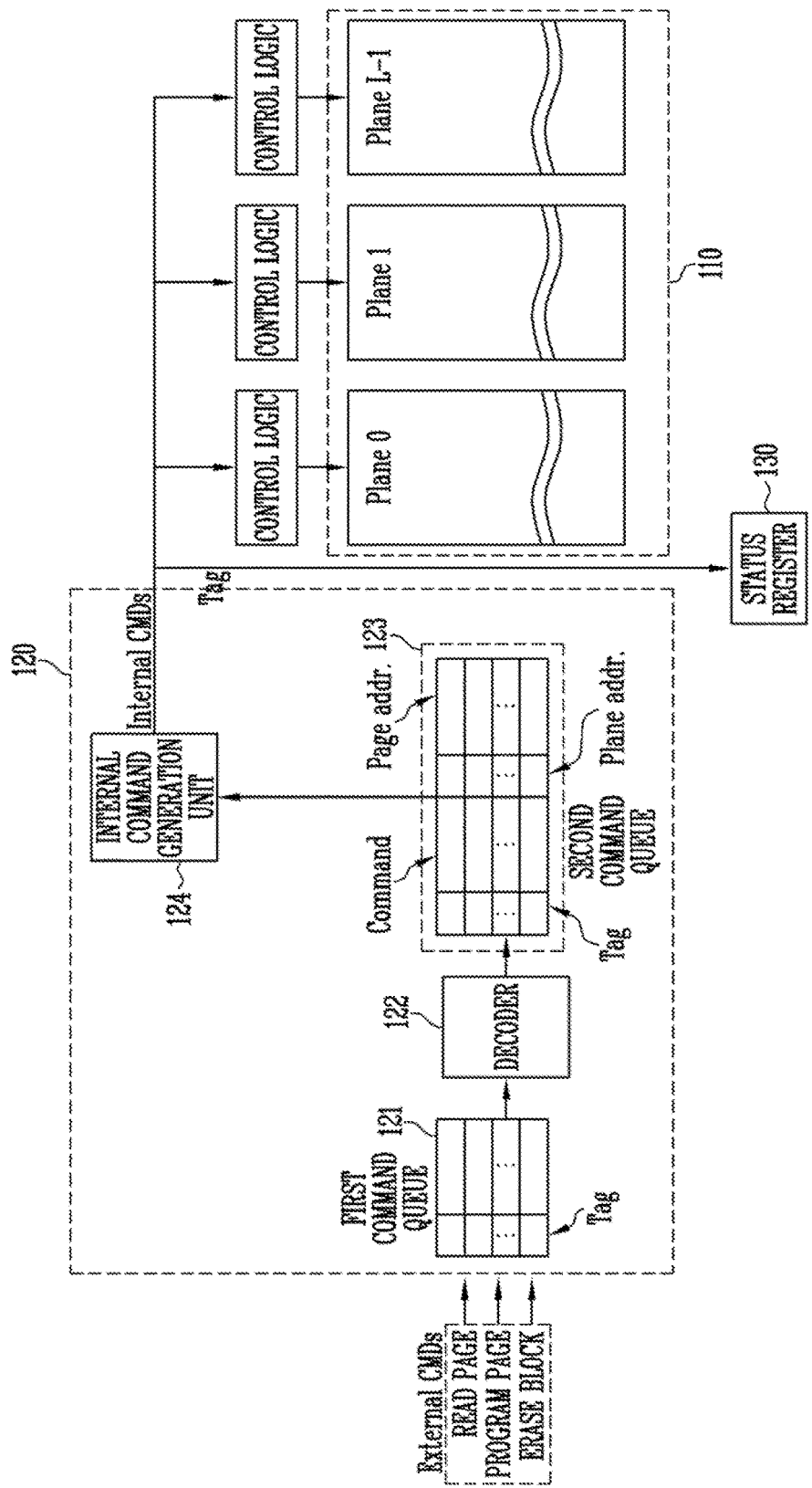
FIG. 3 is a block diagram illustrating a configuration of a command processing unit employed in the semiconductor memory device of FIG. 2, according to an embodiment of the present disclosure.

FIG. 3 is a block diagram illustrating the structure of the command processing unit 120 of FIG. 2.

Referring to FIG. 3, the command processing unit 120 may include a first command queue 121, a decoder 122, a second command queue 123 and an internal command generation unit 124.

The command processing unit 120 may receive an external command from the controller 200 of FIG. 1. The external command may be any one of a read command READ PAGE, a program command PROGRAM PAGE, an erase command ERASE BLOCK, a data input command INPUT DATA, a data output command OUTPUT DATA, a control information request command GET FEATURES, a control information set command SET FEATURES and a reset command RESET. Among them, the read command READ PAGE, the program command PROGRAM PAGE and the erase command ERASE BLOCK (Queued commands) may be inputted to the first command queue 121, and the other data input command INPUT DATA, data output command OUTPUT DATA, control information request command GET FEATURES, control information set command SET FEATURES and reset command RESET (Non-queued commands) may be not inputted to the first command queue 121. The first command queue 121 may be managed in a first-in first-out (FIFO) manner. The first command queue 121 may receive and queue an external command and a tag for the corresponding external command together.

In an embodiment, regardless of whether the semiconductor memory device 100 has completed the execution of the external command, if an empty entry is present in the first command queue 121, the controller 200 may transmit an external command. That is, in the embodiment of the present disclosure, although the controller 200 has transmitted the external command, the internal command generation unit 124 of the semiconductor memory device 100 controls the type of operation through which the corresponding command is executed. Therefore, if an empty entry is generated in the first command queue 121, the external command may be received and queued in the first command queue 121 regardless of whether the semiconductor memory device 100 operates.

The decoder 122 may dequeue the external command queued in the first command queue 121 and decode it. The decoder 122 may decode the external command queued in the first command queue 121 and then provide a result of the decoding to the second command queue 123.

The second command queue 123 may receive the decoded external command from the decoder 122. The second command queue 123 may include a tag Tag, a command Command a plane address Plane addr and a page address Page addr of the memory cell array 110 intended to execute the corresponding command.

In an embodiment, the semiconductor memory device 100 may perform a cache operation, a multi-page operation and a multi-plane operation. Therefore, with regard to the number, that is, the depth, of commands (entries) that can be inputted to the second command queue 123, the second command queue 123 may have to be capable of storing at least twenty-four commands, when it is assumed that a memory cell is a triple-level cell (TLC) and the number of planes is four (DEPTH of the second command queue 123≥cached operation*multi-page operations*multi-plane operation=2*(3 bits per cell)*(4 plane)=24). However, this assumption is only for the sake of convenience in explanation. Therefore, the depth of the second command queue 123 is not limited by the description of the embodiment of FIG. 3.

The internal command generation unit 124 may generate internal commands Internal CMDs using information queued in the second command queue 123. The internal command generation unit 124 may monitor the second command queue 123, and generate internal commands for at least one of planes among a plurality of planes Plane 0 to Plane L-1 of the memory cell array 110 using the commands in the second command queue 123. In an embodiment, the generated internal commands may be commands for a single plane. Alternatively, the generated internal commands may be commands for a multi-plane operation which is an operation for the plurality of planes. In an embodiment, the internal commands may be commands for one page. Alternatively, the internal commands may be commands for a plurality of pages. For example, the internal commands may include commands related to the implementation of the semiconductor memory device 100 such as a single plane erase command, a multi-plane erase command, a single plane program command, a multi-plane program command, a cache program command a multi-page program command, a single plane read command, a multi-plane read command, a cache read command, a random read command, a multi-page read command, a half-page read command, a foggy-fine program command or a copyback operation command.

The internal generation unit 124 may monitor the second command queue 123. In an embodiment, the internal command generation unit 124 may monitor the second command queue 123 during a reference time period and generate the internal commands.

The internal command generation unit 124 may determine whether a multi-plane operation for at least two commands included in the second command queue 123 is possible. For example, when a plurality of commands having different plane addresses are included in the second command queue 123, the internal command generation unit 124 may fetch commands capable of performing the multi-plane operation from the second command queue 123 and generate a single mufti-plane command as an internal command. The internal command generation unit 124 may transmit the generated internal command to the control logic.

If the multi-plane operation is impossible, that is, if a plurality of commands for a single plane are present in the second command queue 123, the internal command generation unit 124 may determine whether a multi-page operation is possible. For example, when a plurality of commands having the same plane address are present in the second command queue 123, the internal command generation unit 124 may fetch commands capable of performing the multi page operation from the second command queue 123 and generate a single multi-page command as an internal command. The internal command generation unit 124 may transmit the generated internal command to the control logic.

If the multi-plane operation and the mufti-page operation are impossible, the internal command generation unit 124 may monitor the second command queue 123 until the reference time period elapses.

If the reference time period has elapsed (or timed out), the internal command generation unit 124 may fetch commands of the second command queue 123 for the single plane operation and transmit the respective commands to the control logic.

In an embodiment, the internal command generation unit 124 may transmit the generated internal command to the control logic, and provide a tag of each command and information about it to the status register 130.

Figure 4:
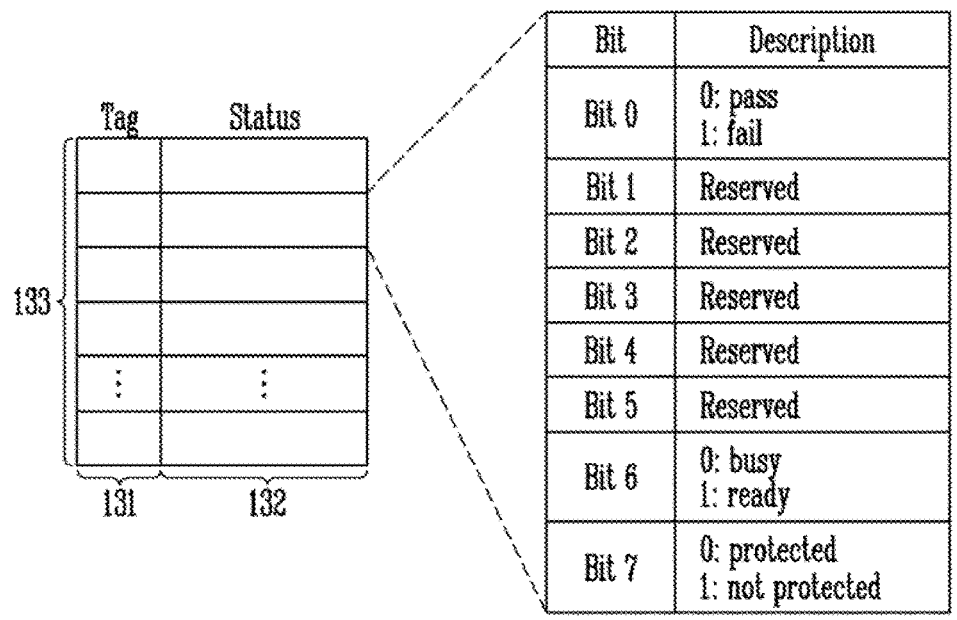
FIG. 4 is a diagram illustrating a configuration of a status register which is employed in the semiconductor memory device of FIG. 2 and contents stored therein, according to an embodiment of the present disclosure.

FIG. 4 illustrates a structure of the status register 130 of FIG. 2 and contents stored therein.

The status register 130 may store a tag of an internal command generated by the command processing unit 120 of FIG. 3 and status information of the corresponding command. The status information of the internal command may be information about whether or not the execution of the corresponding command has been completed and whether it has passed or failed.

Referring to FIG. 4, the status register 130 may include a first field for a tag 131 and a second field for a status information 132 of the corresponding tag. In an embodiment, the status information 132 may be configured with 8 bits. For example, a first bit Bit 0 may indicate whether the execution of an external command corresponding to the corresponding tag has passed (i.e., a value "0" indicating "pass") or failed (i.e. a value "1" indicating "fail"). In addition, a seventh bit Bit 6 may indicate whether the corresponding command is being operated (i.e., a value "0" indicating "busy") or the operation thereof has been completed (i.e., a value "0" indicating "ready"). An eighth bit Bit 7 may indicate whether the status information of the tag is protected (i.e., a value "0") or not (i.e., a value "1"). However, this is only for illustrative purposes, and data included in the status information 132 or the form thereof may be modified.

In an embodiment, the status register 130 may not include status information about a cache operation, a multi-plane operation or a multi-page operation. That is, the status register 130 may include only tags of external commands received from the controller 200 and status information of commands corresponding to the respective tags. This is because the cache operation the multi-plane operation or the multi-page operation is generated by the operation of the command processing unit 120 of the semiconductor memory device 100, and information about whether the external command is executed through the cache operation, the multi-plane operation or the multi-page operation is unnecessary data for the controller 200.

In an embodiment, the status register 30 may not include information about, for example, whether the second command queue 123 included in the command processing unit 120 of FIG. 2 has an empty space. The reason for this is because of the fact that, regardless of whether the semiconductor memory device 100 has completed the execution of the external command, if an empty entry is present in the first command queue 121, the controller 200 may transmit the external command thereto. That is, in the embodiment of the present disclosure, although the controller 200 has transmitted the external command, the internal command generation unit 124 of the semiconductor memory device 100 controls the type of operation through which the corresponding command is executed. Therefore, if an empty entry is generated in the first command queue 121, the external command may be inputted regardless of whether the semiconductor memory device 100 operates.

In an embodiment, the controller 200 may obtain, using a read status command, the information stored in the status register 130. The number of entries that can be stored in the status register 130, that is, the depth 133 of the status register 130, may be the same as the number or depth of entries of the second command queue 123 included in the command processing unit 120.

Figure 5:
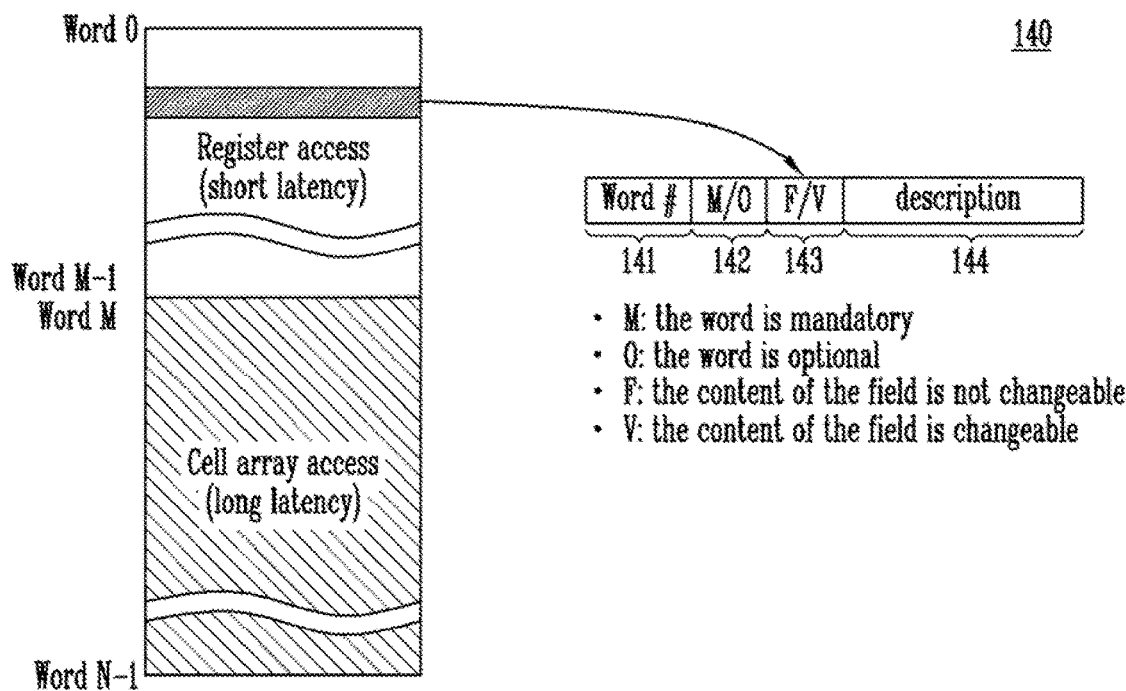
FIG. 5 is a diagram illustrating a configuration a control register which is employed in the semiconductor memory device of FIG. 2 and contents stored therein, according to an embodiment of the present disclosure.

FIG. 5 is a diagram illustrating the structure of the control register 140 of FIG. 2 and contents stored therein.

Referring to FIG. 5, the control register 140 stores data to a plurality of word addresses (e.g., N word addresses Word 0 to Word N-1). The control register 140 may store information about various parameters of the semiconductor memory device 100. The parameter information may include information about various parameters related to the semiconductor memory device 100 such as page information, plane information, information about the type of a memory cell, program voltage information, erase voltage information and read voltage information that are included in the semiconductor memory device 100. In an embodiment, the type of a memory cell may be any one type of a single-level cell (SLC) storing one data bit in the memory cell, a multi-level cell (MLC) storing two data bits, or a triple-level cell (TLC) storing three data bits. Alternatively, in an embodiment, the type of the memory cell may be a quad-level cell (QLC) type storing at least four data bits in the memory cell.

In an embodiment, the control register 140 may be divided into a word address field (Word#) 141, an information type field (M/O) 142 that indicates whether the corresponding parameter information is mandatory information (M) or optional information (O), an information change field (F/V) 143 that indicates whether the corresponding parameter information is changeable (V) or not changeable (F), and a parameter value field (description) 144. The parameter information may be separately stored in the word address field (Word#) 141, the information type field (M/O) 142, and the information change field (F/V) 143 of the control register 140. However, this is only one example of storing the parameter information, and the form of storing the parameter information according to the present disclosure is not limited by the embodiment of FIG. 5.

The parameter information included in the control register 140 may be stored in the control register 140 itself, or in a specific region of a memory cell array. Parameter information (i.e., register access information) stored in the control register 140 itself may be relatively high in loading speed (that is, have short latency), and parameter information (i.e., cell array access information) stored in the memory cell array may be relatively low in loading speed (in other words, have long latency). The position at which parameter information included in the control register 140 is stored may be identified by word addresses. Referring to FIG. 5, parameter information that is directly stored in the control register 140 is stored in a zeroth word address Word 0 to an $M-1_{th}$ word address Word M-1, and parameter information that is stored in the memory cell array is stored in an $M_{th}$ word address Word M to an $N-1_{th}$ word address Word N-1.

In an embodiment, parameter information stored in the memory cell array may be stored in an One Time Programmable (OTP) block among the memory blocks.

The parameter information stored in the control register 140 may be classified into changeable parameters and non-changeable parameters. The controller 200 may transmit a control information request command, which requests the value of the control register 140, and obtain parameter information. Here, the control information request command may be a GET FEATURES command. The controller 200 may transmit a control information set command for changing the value of the control register 140, and change the parameter information. In this regard, the control information set command may be a SET FEATURES command.

In an embodiment, the parameter information may include information about the depth of the first command queue 121 of FIG. 3 and the depth of the second command queue 123 of the command processing unit 120 and the depths of page buffers included in the read/write circuit 150. Therefore, the controller 200 may determine, using a control information request command, the depth of the first command queue 121 and the depths of page buffers that are included in the semiconductor memory device 100. If an empty space is present in the first command queue 121 or the page buffers, the controller 200 may transmit an external command and data regardless of whether the semiconductor memory device 100 is executing a command.

Figure 6:
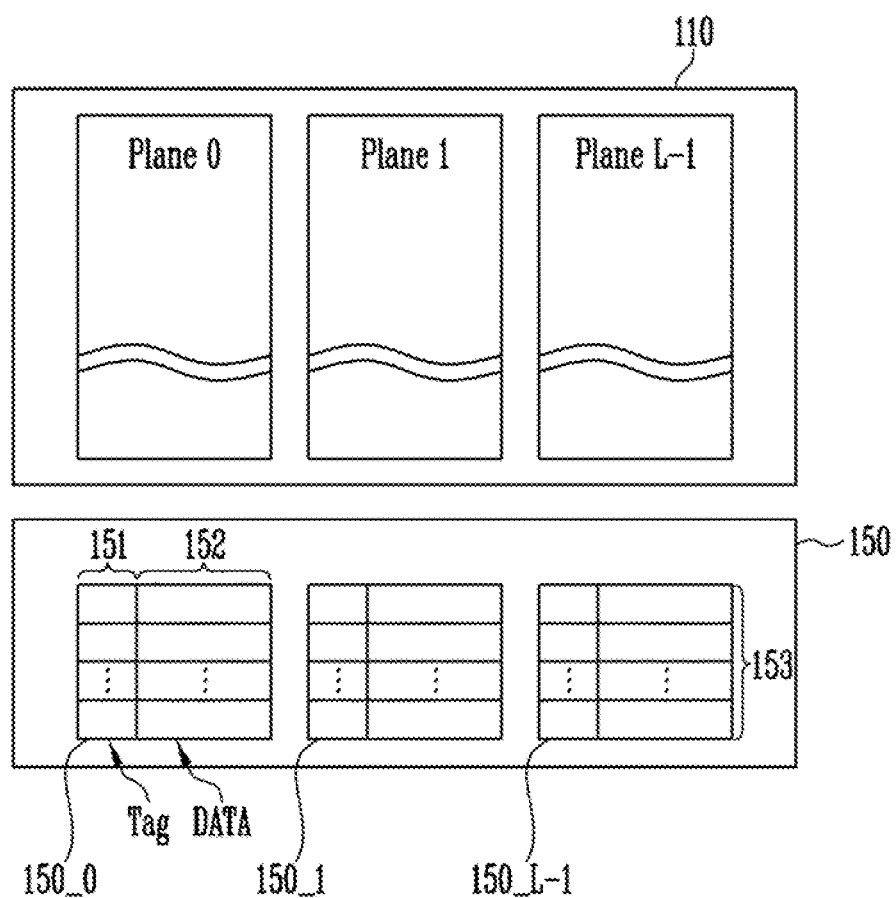
FIG. 6 is a block diagram illustrating a configuration of page buffers included in a read/write circuit which is employed in the semiconductor memory device of FIG. 2, according to an embodiment of the present disclosure.

FIG. 6 is a block diagram illustrating page buffers included in the read/write circuit 150 of FIG. 2.

Referring to FIG. 6, the read/write circuit 150 may include a plurality of page buffers 150_0 to 150_L-1.

The number of page buffers 150_0 to 150_L-1 may be the same as the number of planes of the memory cell array 110. The plurality of page buffers 150_0 to 150_L-1 are coupled to the memory cell array 100 through a plurality of bit lines (not shown). In an embodiment, one first command queue 121 and one second command queue 123 of FIG. 3 and one status register 130 of FIG. 4 may be present for each of the dies of the semiconductor memory device 100. However, one of the page buffers 150_0 to 150_L-1 is present for each of the planes of the memory cell array 110. The reason for this is because a comparatively large overhead is caused when data is transmitted on a page basis in the semiconductor memory device 100. During a program, the page buffers 150_0 to 150_L-1 may receive data to be programmed from the controller 200. During a read operation, the page buffers 150_0 to 150_L-1 may output data read out from the memory cell array 110 to the controller 200. The controller 200 may input data to the page buffers or obtain data stored in the page buffers, through a data input command INPUT DATA and a data output command OUTPUT DATA.

The page buffers 150_0 to 150_L-1 may store tags 151 and data 152 corresponding to the associated tags. In an embodiment, each of the tags stored in the page buffers may have the same value as that of a tag of a command corresponding to the associated tag. The command for the corresponding data may be identified by the tag. For example, data stored in the same tag as that of a program command may be data to be programmed by the corresponding program command. In addition, data stored in the same tag as that of a read command may be data read out according to the corresponding read command.

In an embodiment, the depth of each of the page buffers 150_1 to 150_1 may be the same as that of the command queue included in the command processing unit 120 of FIG. 2.

Figure 7:
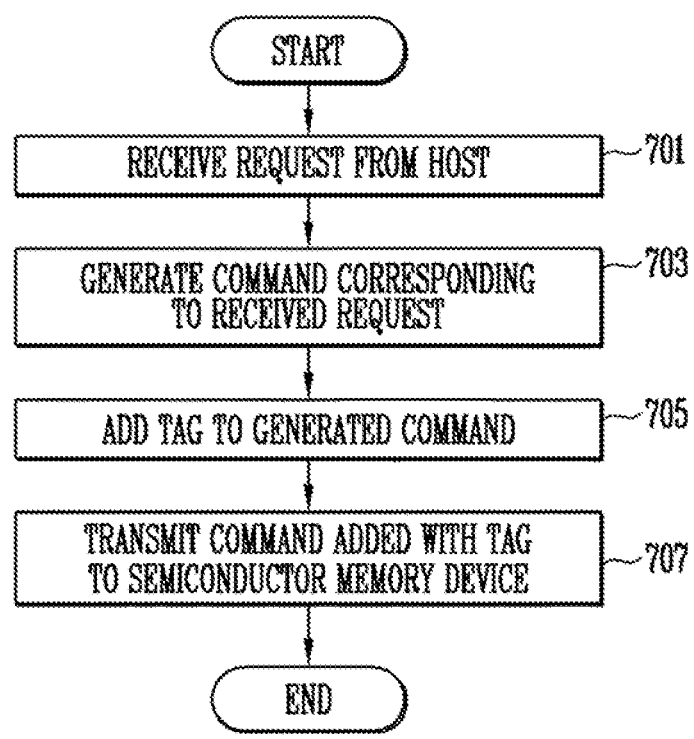
FIG. 7 is a flowchart illustrating the operation of a controller which is employed in the memory system of FIG. 1, according to an embodiment of the present disclosure.

FIG. 7 is a flowchart of the operation of a controller, according to an embodiment of the present disclosure. For example, the controller of FIG. 7 may be the controller 200 of FIG. 1.

Referring to FIG. 7, the controller 200 may receive a request from the host, at step 701. The request from the host may be any one of a read request, a program request or an erase request.

At step 703, the controller 200 may generate a command corresponding to the received request. The request received from the host includes a logic address. The controller 200 may translate the logic address into a physical address. The controller 200 may generate a command for the translated physical address. In an embodiment, the command may be any one of a read command a program command or an erase command.

At step 705, the controller 200 may add a tag Tag to the generated command. Different tags may be added to respective commands. In an embodiment, tags may be successively added to commands in a round-robin manner. Each command may be identified by the corresponding added tag.

At step 707, the controller 200 may transmit the command added with the tag to the semiconductor memory device 100 of FIG. 1.

In an embodiment, the controller 200 may separately store the tags and information related to the commands of the corresponding tags. Thereafter, the controller 200 may receive, through a read status command READ STATUS, information about whether execution of each command corresponding to the associated tag has been completed or not and whether it has passed or failed, from the semiconductor memory device 100.

In an embodiment the controller 200 may determine, using, a control information request command GET FEATURES, the depth of the first command queue 121 of FIG. 3 and the depths of the page buffers that are included in the read/write circuit 150 of the semiconductor memory device 100. When an empty space is present in the first command queue 121 or the page buffers the controller 200 may transmit an external command and data regardless of whether the semiconductor memory device 100 is executing a command.

Figure 8:
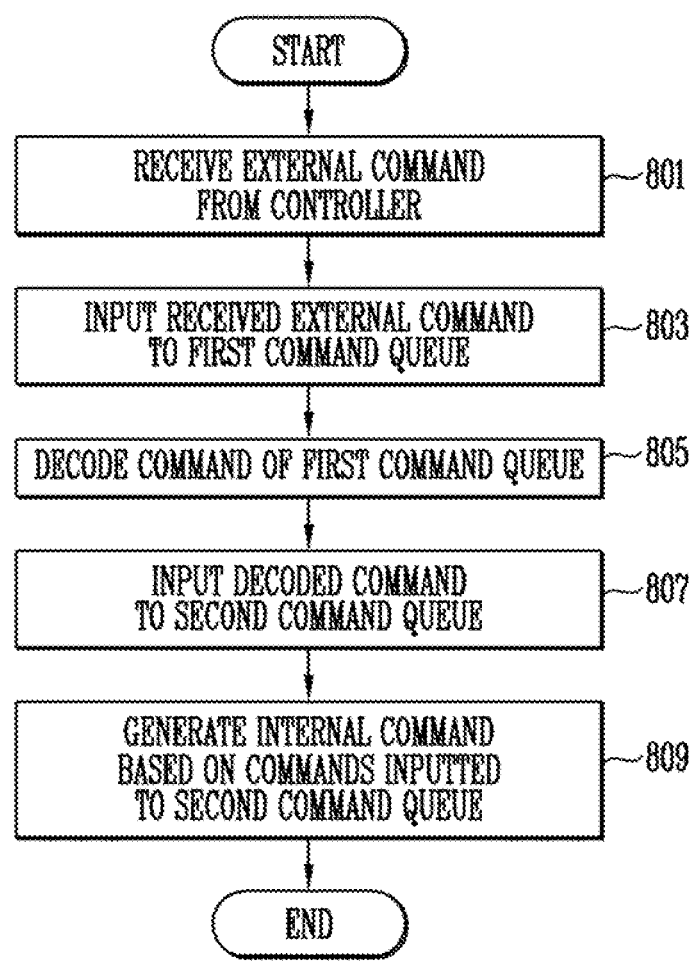
FIG. 8 is a flowchart illustrating the operation of a semiconductor memory device which is employed in the memory system of FIG. 1, according to an embodiment of the present disclosure.

FIG. 8 is a flowchart of an operation of a semiconductor memory device, according to an embodiment of the present disclosure. For example, a semiconductor memory device of FIG. 8 may be the semiconductor memory device 100 of FIG. 2.

Referring to FIG. 8, the semiconductor memory device 100 may receive an external command from the controller 100 of FIG. 1 at step 801. The external command may be any one of a read command READ PAGE, a program command PROGRAM PAGE, an erase command ERASE BLOCK, a data input command INPUT DATA, a data output command OUTPUT DATA, a control information request command GET FEATURES, a control information set command SET FEATURES and a reset command RESET. External commands received from the controller 100 may include respective tags which are used to identify the corresponding external commands.

At step 803, the semiconductor memory device 100 may input the received external commands to the first command queue 121 of FIG. 3. Among the external commands, the read command READ PAGE, the program command PROGRAM PAGE and the erase command ERASE BLOCK (Queued commands) may be inputted to the first command queue 121, and the other data input command INPUT DATA, data output command OUTPUT DATA, control information request command GET FEATURES, control information set command SET FEATURES and reset command RESET (Non-queued commands) may be not inputted to the first command queue 121. In an embodiment, the first command queue 121 may be managed in a first-in first-out (FIFO) manner. The first command queue 121 may input an external command and a tag for the corresponding external command together.

At step 805, the semiconductor memory device 100 may decode the commands of the first command queue 121.

At step 807, the semiconductor memory device 100 may input the decoded commands to the second command queue 123 of FIG. 3. In an embodiment, the second command queue 123 may include a tag Tag, a command Command, a plane address Plane addr and a page address Page addr of the memory cell array 110 intended to execute the corresponding command.

At step 809, the semiconductor memory device 100 may generate an internal command on the basis of commands inputted to the second command queue 123. The semiconductor memory device 100 may generate internal commands (Internal CMDs) using information inputted to the second command queue 123. For example, the semiconductor memory device 100 may monitor the second, command queue 123, and generate internal commands for at least one plane among the plurality of planes Plane 0 to Plane L-1 of the memory cell array 110 using the commands inputted to the second command queue 123. In an embodiment, the generated internal commands may be commands for a single plane. Alternatively, the generated internal commands may be commands for a multi-plane operation which is an operation for a plurality of planes. In an embodiment, the internal commands may be commands for one page. Alternatively, the internal commands may be commands for a plurality of pages. For example, the internal commands may include commands related to the implementation of the semiconductor memory device 100 such as a single plane erase command, a multi-plane erase command, a single plane program command, a multi-plane program command, a cache program command, a multi-page program command, a single plane read command, a multi-plane read command, a cache read command, a random read command, a multi-page read command, a half-page read command, a foggy-fine program command or a copyback operation command.

A method by which the semiconductor memory device 100 generates internal commands will be explained in more detail in the following description of FIG. 9.

Figure 9:
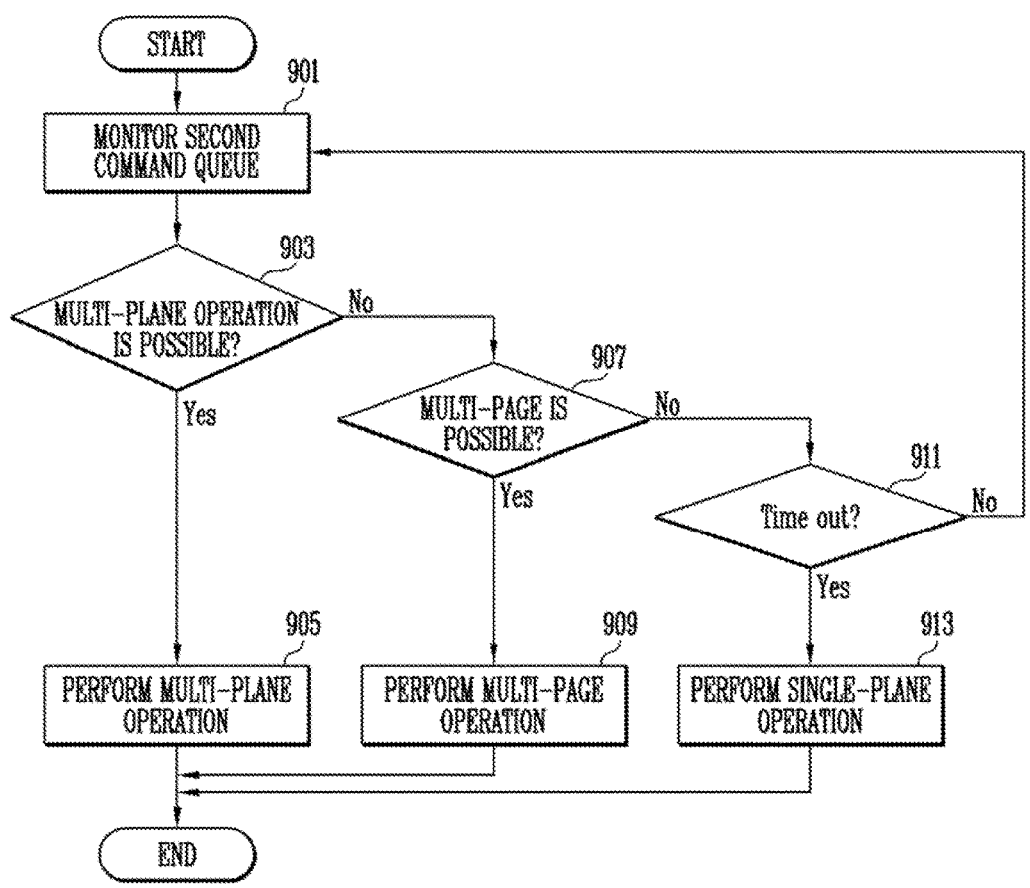
FIG. 9 is a flowchart illustrating a step of generating an internal command of FIG. 8.

FIG. 9 is a flowchart of a method of performing the step 809 of generating an internal command in FIG. 8.

Referring to FIG. 9, at step 901, the semiconductor memory device 100 of FIG. 2 may monitor the second command queue 123 of FIG. 3. In an embodiment, the semiconductor memory device 100 may monitor the second command queue 123 during a reference time period and generate the internal command.

At step 903, the semiconductor memory device 100 may determine whether a mufti-plane operation for at least two commands included in the second command queue 123 is possible. For example, when a plurality of commands having different plane addresses are included in the second command queue 123, the multi-plane operation may be possible. When the multi-plane operation is possible, the process may move to step 905.

At step 905, the semiconductor memory device 100 may perform the multi-plane operation. For example, the semiconductor memory device 100 may fetch a plurality of commands capable of performing the multi-plane operation from the second command queue 123, and generate a single multi-plane command as an internal command. The semiconductor memory device 100 may execute the generated internal command, thereby performing the multi-plane operation.

As a result of the determination at step 903 if the multi-plane operation is impossible, that is, when a plurality of commands for a single plane are present in the second command queue 123, the process may move to step 907.

At step 907, the semiconductor memory device 100 may determine whether a multi-page operation is possible. For example, when a plurality of commands having the same page address are included in the second command queue 123, it may be determined that the multi-page operation is possible. In an embodiment, the multi-page operation may be a one-shot program operation which simultaneously programs a plurality of logic page data. Alternatively, the multi-page operation may be a multi-page read operation which simultaneously reads a plurality of logic pages. As a result of the determination at step 907, if the multi-page operation is possible, the process may move to step 909.

At step 909, the semiconductor memory device 100 performs the multi-page operation. In detail, the semiconductor memory device 100 may fetch commands capable of performing the multi-page operation from the second command queue 123, and generate a single multi-page command as an internal command. The semiconductor memory device 100 may execute the generated internal command, thereby performing; the multi-page operation.

As a result of the determination at step 907 if the multi-page operation is impossible, the process may move to step 911.

At step 911, the semiconductor memory device 100 may determine whether the reference time period has elapsed. If the reference time period has not elapsed, the semiconductor memory device 100 may move to step 901 and monitor the second command queue 123. As a result of the determination at step 911, if the reference time period has elapsed time out), the process may move to step 913.

At step 913, the semiconductor memory device 100 may execute a single plane operation. The semiconductor memory device 100 may fetch commands of the second command queue 123 for a single plane operation, and execute the respective commands, thereby performing the single plane operation.

In an embodiment, if an internal command is generated, the semiconductor memory device 100 may store a tag of the internal command and information about it in the status register 130 of FIG. 2.

Figure 10:
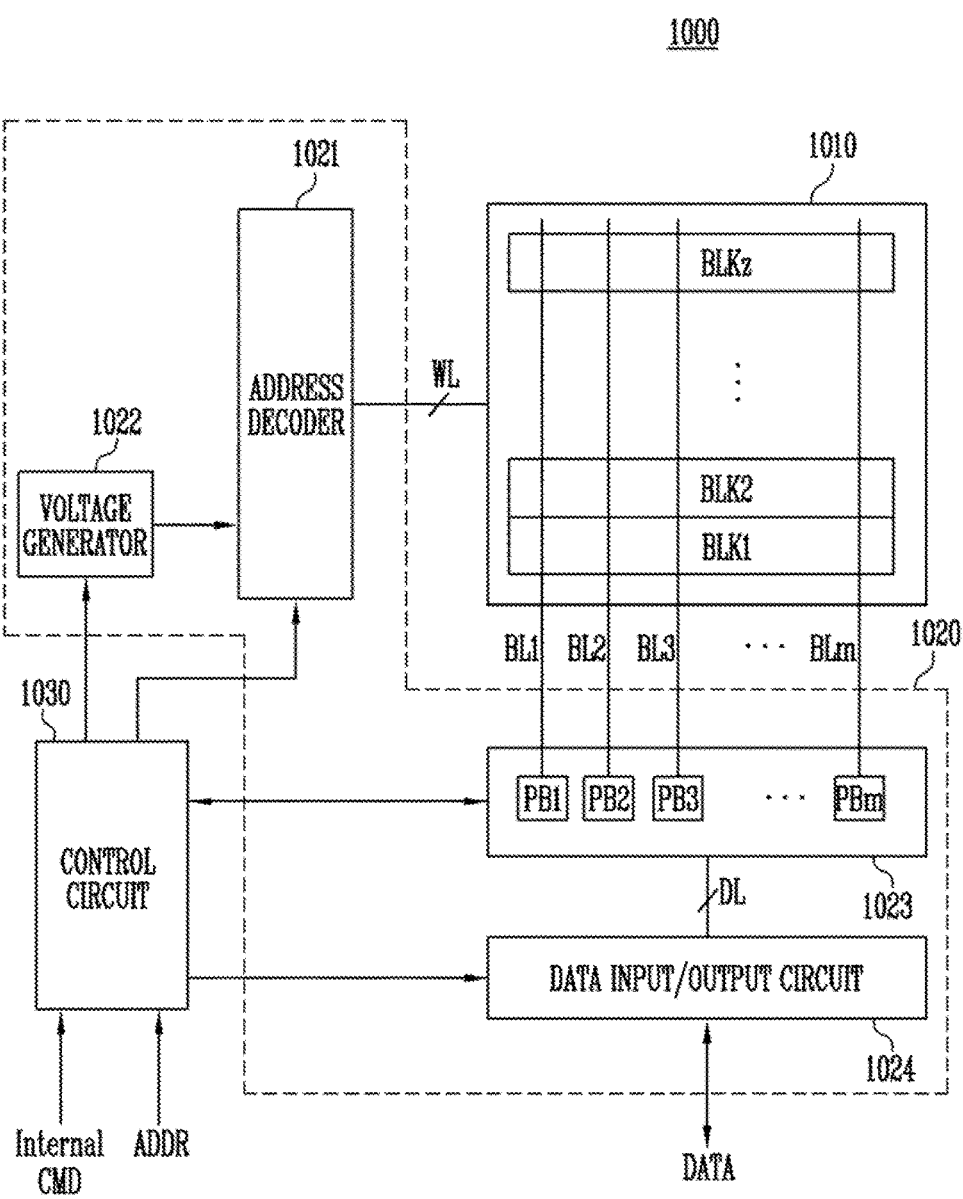
FIG. 10 is a block diagram showing an embodiment of the semiconductor memory device of FIG. 2.

FIG. 10 is a block diagram showing a semiconductor memory device 1000, according to an embodiment of the present disclosure. The semiconductor memory device incorporates the features of the semiconductor memory device 100 of FIG. 2.

Referring to FIG. 10, the semiconductor memory device 1000 may include a memory cell array 1010, a peripheral circuit 1020 and a control circuit 1030.

The peripheral circuit 1020 may include an address decoder 1021, a voltage generator 1022, a read/write circuit 1023, and a data input/output circuit 1024.

The memory cell array 1010 includes a plurality of memory blocks (e.g., z memory blocks BLK1 to BLKz). The plurality of memory blocks may be included in a memory plane among a plurality of memory planes included in the semiconductor memory device as illustrated in FIG. 2. The memory blocks BLK1 to BLKz are coupled to the address decoder 1021 through word lines WL. The memory blocks BLK1 to BLKz are coupled to the read/write circuit 1023 through bit lines BL1 to BLm. Each of the memory blocks BLK1 to BLKz includes a plurality of memory cells. In an embodiment the plurality of memory cells may be nonvolatile memory cells. Memory cells coupled to the same word line among the plurality of memory cells are defined as one page. In other words, the memory cell array 1010 is formed of a plurality of pages.

The peripheral circuit 1020 drives the memory cell array 1010 according to control of the control circuit 1030. For example, the peripheral 1020 may drive the memory cell array 1010 to perform a program operation, a read operation and an erase operation according to the control of the control circuit 1030.

The address decoder 1021 is coupled to the memory cell array 1010 through the word lines WL. The address decoder 1021 is configured to operate in response to control of the control logic 1030. The address decoder 1021 receives addresses ADDR from the control circuit 1030 through an input/output buffer (not shown) provided in the semiconductor memory device 1000.

The address decoder 1021 is configured to decode a block address among the received addresses ADDR. The address decoder 1021 selects at east one of the memory blocks BLK1 to BLKz according to the decoded address. The address decoder 1021 is configured to decode a row address among the received addresses ADDR. According to the decoded row address, the address decoder 1021 may apply voltages, provided from the voltage generator 1022, to at least one word line WL and select at least one word line of the selected memory block.

During a program operation, the address, decoder 1021 may apply a program voltage to a selected word line and apply a pass voltage having a level lower than the program voltage to non-selected word lines. During a program verification operation, the address decoder 1021 may apply a verification voltage to a selected word line and apply a pass voltage higher than the verification voltage to non-selected word lines.

During a read operation, the address decoder 1021 may apply a read voltage to a selected word line and apply a pass voltage higher than the read voltage to non-selected word lines.

In an embodiment, an erase operation of the semiconductor memory device 1000 is performed on a memory block basis. During an erase operation, address ADDR inputted to the semiconductor memory device 1000 include a block address. The address decoder 1021 may decode the block address and select one memory block according to the decoded address. During an erase operation, the address decoder 1021 may apply a ground voltage to a word line inputted to the selected memory block. In an embodiment, the address decoder 1021 may include a block decoder, a word line decoder and an address buffer, etc.

The voltage generator 1022 is configured to generate a plurality of voltages from an external power supply voltage that is applied to the semiconductor memory device 1000. The voltage generator 1022 is operated in response to the control of the control circuit 1030.

In an embodiment, the voltage generator 1022 may generate an internal power supply voltage by regulating an external power supply voltage. The internal power supply voltage generated by the voltage generator 1022 is used as an operating voltage for the semiconductor memory device 1000.

In an embodiment, the voltage generator 1022 may generate a plurality of voltages using the external power supply voltage or the internal power supply voltage. For example, the voltage generator 1022 may include a plurality of pumping capacitors that receive the internal power supply voltage and generate a plurality of voltages by selectively activating the plurality of pumping capacitors in response to the control of the control circuit 1030. The generated voltages are applied to the selected word lines by the address decoder 1021.

The read/write circuit 1023 includes first to m-$_{th}$ page buffers PB1 to PBm. The first to m-$_{th}$ page buffers PB1 to PBm are respectively coupled to the memory cell array 101 through the first to m-$_{th}$ bit lines BL1 to BLm. The first to m-$_{th}$ page buffers PB1 to PBm are operated in response to the control of the control circuit 1030.

The first to m-$_{th}$ page buffers PB1 to PBm exchange data with the data input/output circuit 1024. During a program, the first to m-$_{th}$ page buffers PB1 to PBm receive data DATA to be stored through the data input/output circuit 1024 and data lines DL.

During a program operation, when a program pulse is applied to a selected word line, the first to m-$_{th}$ page buffers PB1 to PBm may receive data DATA to be stored from the data input/output circuit 1024 and transmit the data DATA to selected memory cells through the bit lines BL1 to BLm. Memory cells of the selected page are programmed according to the transmitted data DATA. A memory cell coupled to a bit line to which a program enable voltage (for example, a ground voltage) is applied may have an increased threshold voltage. A threshold voltage of a memory cell coupled to a bit line to which a program inhibit voltage (for example, a power supply voltage) is applied may be maintained. During a program verification operation, the first to m-$_{th}$ page buffers PB1 to PBm read page data from selected memory cells through the bit lines BL1 to BLm.

During a read operation the read/write circuit 1023 reads data DATA from memory cells of the selected page through the bit lines BL, and outputs the read data DATA to the data input/output circuit 1024.

During an erase operation, the read/write circuit 1023 may float the bit fines BL. In an embodiment, the read/write circuit 1023 may include a row select circuit.

The data input/output circuit 1024 is coupled to the first to m-$_{th}$ page buffers PB1 to PBm through the data lines DL. The data input/output circuit 1024 operates in response to the control of the control circuit 1030. During a program, the data input/output circuit 1024 receives data DATA to be stored from an external controller (not shown) (e.g., the controller 200 of FIG. 1). During a read operation, the data input/output circuit 1024 outputs data that are received from the first to m-$_{th}$ page buffers PB1 to PBm included in the read/write circuit 1023, to the external controller.

The control circuit 1030 is coupled to the address decoder 1021, the voltage generator 1022, the read/write circuit 1023, and the data input/output circuit 1024. The control circuit 1030 may control the overall operation of the semiconductor memory device 1000. The control circuit 1030 receives the internal commands Internal CMD and the addresses ADDR from the internal command generation unit 124 of FIG. 3. The control circuit 1030 may control the peripheral circuit 1020 in response to the inputted internal commands Internal CMD. The control circuit 1030 may control the address decoder 1021, the voltage generator 1022, the read/write circuit 1023, and the data input/output circuit 1024 to perform an operation corresponding to the received command. In an embodiment, during an erase operation, the control circuit 1030 may apply an erase voltage (Verase) of a high-voltage to a source line.

In an embodiment, the read/write circuit 150 of FIG. 2 may correspond to the read/write circuit 1023 of FIG. 10. The status register 130 and the control register 140 of FIG. 2 may be included in the peripheral circuit 1020 of FIG. 10.

FIG. 11 is a block diagram showing an embodiment 1200 of the controller 200 of FIG. 1.

Referring to FIG. 11, the controller 1200 includes a random access memory (RAM) 1210, a processing unit 1220, a host interface 1230, a memory interface 1240, and an error correction block 1250.

The processing unit 1220 controls the overall operation of the controller 1200. The RAM 1210 may be used as at, least one of an operation memory of the processing unit 1220 a cache memory between, the semiconductor memory device 1300 and the host, and a buffer memory between the semiconductor memory device 1300 and the host.

The host interface 1230 includes a protocol for performing data exchange between the host and the controller 1200. In an embodiment, the controller 1200 may be configured to communicate with the host through at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol and an integrated drive electronics (IDE) protocol, a private protocol, and the like.

The memory interface 1240 may interface with the semiconductor memory device 1300.

The error correction block 1250 may decode, using an error correction code, data received from the semiconductor memory device 1300.

In an embodiment, the processing unit 1220 may include the command generation unit 210 of FIG. 1, the RAM 1210 may include the tag information storage unit 240 of FIG. 1, the command queue 220 and the memory control unit 230 for performing the operations discussed in reference to FIG. 1.

Figure 12:
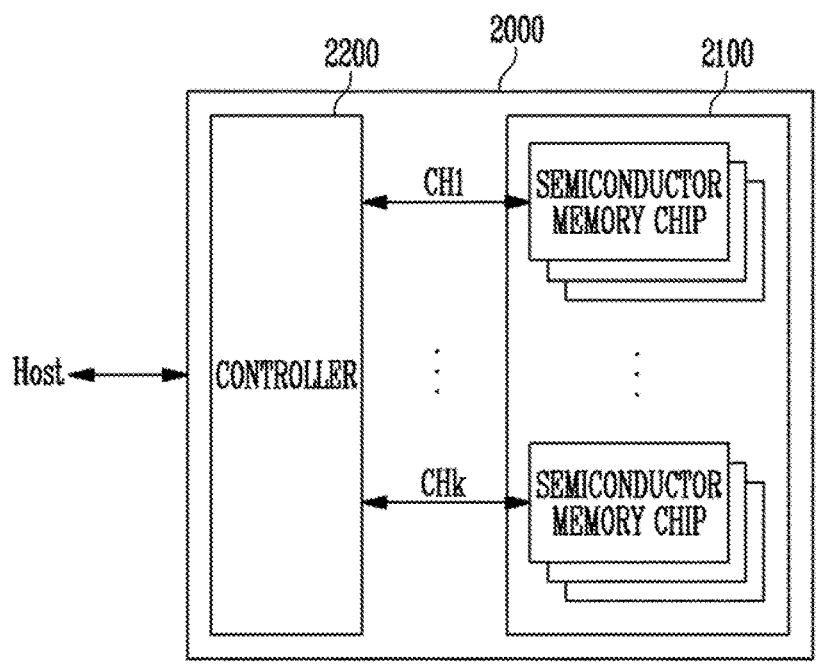
FIG. 12 is a block diagram illustrating a solid state drive, according to an embodiment of the present disclosure.

FIG. 12 is a block diagram showing an example of a memory system 2000 including the controller 1200 of FIG. 11.

Referring to FIG. 12, the memory system 2000 includes a semiconductor memory device 2100 and a controller 2200. The semiconductor memory device 2100 includes a plurality of memory chips. The semiconductor memory chips are divided into a plurality of groups.

In FIG. 12, it is illustrated that the plurality of groups respectively communicates with the controller 2200 through first to k-$_{th}$ channels CH1 to CHk. Each semiconductor memory chip may be configured and operated in the same manner as those of the semiconductor memory device 100 described with reference to FIG. 2.

Each group communicates with the controller 2200 through one common channel. The controller 2200 may have the same configuration as that of the controller 1200 described with reference to FIG. 11 and be configured to control the plurality of memory chips of the semiconductor memory device 2100 through the plurality of channels CH1 to cHk. In FIG. 12, a plurality of semiconductor memory chips are illustrated as being coupled to each channel. However, it will be understood that the memory system 2000 may be modified such that a single memory chip is coupled to each channel.

The controller 2200 and the semiconductor memory device 2100 may be integrated into a single semiconductor device. In an embodiment, the controller 2200 and the semiconductor memory device 2100 may be integrated into a single semiconductor device to form a memory card. For example the controller 2200 and the semiconductor memory device 2100 may be integrated into a single semiconductor device and form a memory card such as a personal computer memory card international association (PCMCIA), a compact flash card (CF), a smart media card (e.g., SM or SMC), a memory stick, a multimedia card (e.g., MMC, RS-MMC, or MMCmicro), a SD card (e.g., SD, miniSD, microSD, or SDHC), a universal flash storage (UFS), and the like.

The controller 2200 and the semiconductor memory device 2100 may be integrated into a single semiconductor device to form a solid state drive (SSD). When the memory system 2000 is used as the SSD, an operation speed of the host Host coupled to the memory system 2000 may be phenomenally improved.

In another embodiment, the memory system 2000 may be provided as one of various elements of an electronic device such as a computer, a ultra mobile PC (UMPC), a workstation, a net-book, personal digital assistants (PDA), a portable computer, a web tablet, a wireless phone, a mobile phone, a smart phone, an e-book, a portable multimedia player (PMP), a game console, a navigation device, a black box, a digital camera, a 3-dimensional television, a digital audio recorder, a digital audio player, a digital picture recorder, a digital picture player a digital video recorder, a digital video player, a device capable of transmitting/receiving information in an wireless environment, one of various devices for forming a home network, one of various electronic devices for forming a computer network, one of various electronic devices for forming a telematics network an RFID device, one of various elements for forming a computing system, or the like.

In an exemplary embodiment, the semiconductor memory device 2100 or the memory system 2000 may be embedded in various types of packages. For example, the semiconductor memory device 2100 or the memory system 2000 may be packaged in a type such as Package on Package (PoP), Ball grid arrays (BGAs), Chip scale packages (CSPs), Plastic Leaded Chip Carrier (PLCC), Plastic Dual In Line Package (PDIP), Die in Waffle Pack, Die in Wafer Form, Chip On Board (COB), Ceramic Dual in Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP) Thin Quad Flatpack (TQFP), System In Package (SIP), Multi Chip Package (MCP), Wafer-level Fabricated Package (WFP), Wafer-Level Processed Stack Package (WSP), or the like.

Figure 13:
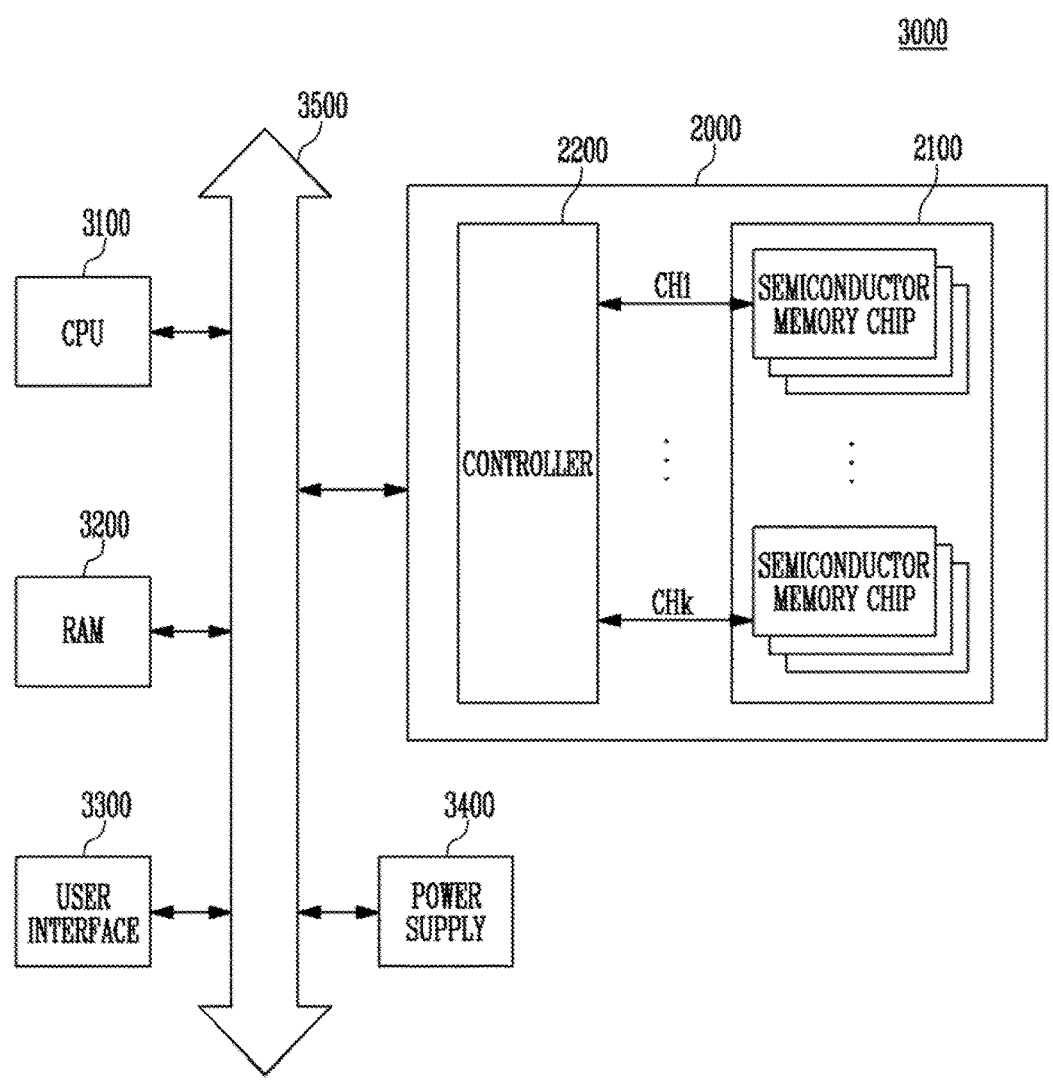
FIG. 13 is a block diagram illustrating a computing system, according to an embodiment of the present disclosure.

FIG. 13 is a block diagram showing a computing system 3000 including the memory system 2000 illustrated with reference to FIG. 12.

Referring to FIG. 13, the computing system 3000 includes a central processing unit (CPU) 3100, a random access memory (RAM) 3200 a use interface 3300, a power supply 3400, a system bus 3500, and the memory system 2000.

The memory system 2000 is electrically coupled to the CPU 3100, the RAM 3200, the user interface 3300, and the power supply 3400 through the system bus 3500. Data provided through the user interface 3300 or processed by the CPU 3100 is stored in the memory system 2000.

In FIG. 13, the semiconductor memory device 2100 is illustrated as being coupled to the system bus 3500 through the controller 2200. However, the semiconductor memory device 2100 may be directly coupled to the system bus 3500. The function of the controller 2200 may be performed by the CPU 3100 and the RAM 3200.

In FIG. 13, the memory system 2000 described with reference to FIG. 12 is illustrated as being used. However, the memory system 2000 may be replaced with the memory system described with reference to FIG. 1. In an embodiment, the computing system 3000 may include all of the memory systems described with reference to FIGS. 1 and 12.

According to the embodiment of the present disclosure the controller may provide only minimal commands for essential operations of the semiconductor memory device, and implementation of a detailed operation by a combination of the corresponding commands may be controlled by the semiconductor memory device. For this, the controller may transmit commands added with tags, to the semiconductor memory device, and the semiconductor memory device may include a command queue and an internal command generation unit, whereby an internal command may be generated. The memory interface according to the embodiment of the present disclosure may be a reduced instruction set computing (RISC) type. Consequently, a NAND flash interface of the controller may be simplified, and the complexity of the controller may be reduced, and the existing controller may be reused.

As described above, an embodiment of the present disclosure provides a memory system having a simple flash memory interface, and an operating method thereof.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A semiconductor memory device comprising:
a memory cell array including a plurality of planes;
a command processor configured to generate an internal command to be executed by at least one plane among the plurality of planes based on external commands received from an external controller;
a status register configured to store status information of the external commands by tags included in the external commands according to results of performing the internal command; and
a read/write circuit configured to include a plurality of page buffers corresponding to the plurality of planes, respectively,
wherein the command processor comprises:
a first command queue configured to store the external commands;
a decoder configured to decode and output the external commands stored in the first command queue;
a second command queue configured to store decoded commands outputted from the decoding unit; and
an internal command generator configured to monitor the second command queue and generate the internal command for the at least one plane.

2. The semiconductor memory device according to claim 1, wherein the external commands comprise commands for the memory cell array, and the tags.

3. The semiconductor memory device according to claim 1,
wherein the second command queue comprises the tags, plane addresses, page addresses and commands.

4. The semiconductor memory device according to claim 1,
wherein the internal command generation unit generates the internal command for any one of a multi-plane operation, a multi-page operation or a single-plane operation using the decoded commands stored in the second command queue.

5. The semiconductor memory device according to claim 1,
wherein the internal command generator determines whether a multi-plane operation based on the decoded commands is possible, and fetches, if the multi-plane operation is possible, the plurality of decoded commands capable of performing the multi-plane operation from the second command queue, and generates a single multi-plane command as the internal command.

6. The semiconductor memory device according to claim 1,
wherein the internal command generator determines whether a multi-page operation based on the decoded commands is possible, and fetches, if the multi-page operation is possible, a plurality of the decoded commands capable of performing the multi-page operation from the second command queue, and generates a single multi-page command as the internal command.

7. The semiconductor memory device according to claim 1,
wherein depths of the second command queue, the status register and each of the page buffers are the same.

8. The semiconductor memory device according to claim 1, further comprising:
a control register configured to store parameter information about a depth of the first command queue, a depth of the second command queue and a depth of each of the page buffers.

9. The semiconductor memory device according to claim 8,
wherein the parameter information is stored in the control register, or in a partial region of the memory cell array.

10. The semiconductor memory device according to claim 8,
wherein the control register is divided into a word address field, an information type field that indicates whether the parameter information is mandatory information, an information change field that indicates whether the parameter information is changeable, and a parameter value field, and the parameter information is stored in the control register in such a way that the parameter information is separately stored in the word address field, the information type field, the information change field and the parameter value field.

11. The semiconductor memory device according to claim 1,
wherein the plurality of page buffers store the tags, and data related to commands corresponding to the tags.

12. The semiconductor memory device according to claim 1,
wherein the status register includes the tags and information that indicates whether execution of the commands corresponding to the tags has been completed and whether the execution of the commands has passed or failed.

13. A controller for controlling a semiconductor memory device including a memory cell array divided into a plurality of planes, the controller comprising:
a command generator configured to generate a command for the semiconductor memory device in response to a request received from an external host and add a tag for identifying the generated command;
a command queue configured to input the generated command and tag; and
a memory controller configured to transmit an external command to the semiconductor memory device, the external command including the command and the tag inputted to the command queue, wherein the command generator adds the tag to the command in a round-robin manner, and the semiconductor device comprising:

a read-write circuit configured to include a plurality of page buffers corresponding to the plurality of planes, respectively, a command processor comprising:

a first command queue configured to store the external commands;

a decoder configured to decode and output the external commands stored in the first command queue;

a second command queue configured to store decoded commands outputted from the decoding unit; and an internal command generator configured to monitor the second command queue and generate the internal command for the at least one plane.

14. The controller according to claim 13, wherein the command comprises any one of a read command, a program command or an erase command.

15. The controller according to claim 13, further comprising:

a tag information storage configured to store the tag and command information corresponding to the tag.

16. The controller according to claim 13, wherein the memory controller transmits a control information request command to the semiconductor memory device, and determines transmission of the external command based on information of a control register that is received in response to the control information request command, the control register being included in the semiconductor memory device.

* * * * *